United States Patent Office 3,829,516
Patented Aug. 13, 1974

3,829,516
PRODUCTION OF CYCLOALKYLAROMATICS
Ernest A. Zuech and Marvin M. Johnson, Bartlesville, Okla., assignors to Phillips Petroleum Company
No Drawing. Filed Feb. 21, 1973, Ser. No. 334,388
Int. Cl. C07c 15/12
U.S. Cl. 260—668 R                    5 Claims

ABSTRACT OF THE DISCLOSURE

Cycloalkylaromatics are produced from aromatic hydrocarbons in the presence of hydrogen and a rhodium-active clay catalyst. Preferably the catalyst has not been heated under calcination conditions prior to use. In a specific embodiment, benzene is converted to cyclohexylbenzene with good selectivity over an active clay impregnated with rhodium trichloride wherein the solvent has been removed under conditions which do not subject the catalyst composition to calcination temperature.

---

This invention relates to the conversion of aromatic hydrocabons to cycloalkylaromatics and/or alkyl-substituted cycloalkylaromatics. In accordance with one aspect, this invention relates to an improved process and catalyst for conversion of benzene to cyclohexylbenzene over a catalyst comprising rhodium and an active clay. In accordance with another aspect, this invention relates to an improved catalyst for the conversion of aromatics to cycloalkylaromatics which catalyst has been prepared by impregnation of an active clay with an alcoholic or aqueous solution of a rhodium halide followed by heating at an elevated temperature sufficient to remove the solvent but insufficient to subject the catalyst composition to calcination conditions.

Methods are available in the art for the coupling of aromatic nuclei in the presence of molecular hydrogen to produce an at least partially hydrogenated dimer derivative of the aromatic reactant. For example, benzene is converted at elevated temperature to a mixture containing cyclohexylbenzene in the presence of various catalysts. Cyclohexylbenzene is known as a valuable solvent and chemical intermediate. It can be converted in high yield to phenol and cyclohexanone by autooxidation with subsequent acid treatments. None of the prior art methods of producing cyclohexylbenzene have yet been proven for a stable continuous operation necessary for commercial exploitation. Problems therewith include high catalyst cost, catalyst stability and regeneration.

In accordance with the invention, there has been discovered a process utilizing an improved rhodium-clay catalyst which provides not only excellent selectivity for the conversion of aromatics to cycloalkylaromatic hydrocarbons, but which is suitable for continuous operation.

Accordingly, an object of the present invention is to provide an improved process for the conversion of aromatic hydrocarbons to cycloalkylaromatic hydrocarbons.

Another object of the invention is to provide an improved process and catalyst for the production of cyclohexylbenzene from benzene.

A further object of this invention is to provide an improved rhodium catalyst exhibiting excellent selectivity for the conversion of benzene to cyclohexylbenzene.

Other aspects, objects and the several advantages of the invention will be apparent to those skilled in the art upon reading the specification and the appended claims.

In accordance with the invention, a process is provided for producing cycloalkylaromatics and alkyl-substituted cycloalkylaromatics from aromatic hydrocarbons by contacting a monocyclic aromatic hydrocarbon or alkyl-substituted monocyclic aromatic hydrocarbon with hydrogen in the presence of a rhodium-active clay catalyst.

In accordance with a preferred embodiment of the invention, in the preparation of the rhodium-active clay catalyst the alcoholic or aqueous solvent used as a carrier for the rhodium compound for impregnation of the active clay is removed under conditions sufficient to volatilize the alcohol or water and remove same from the catalyst, but the conditions are such that the catalyst composition is not calcined.

In accordance with a specific embodiment of the invention, a catalyst exhibiting excellent selectivity for the conversion of benzene to cyclohexylbenzene has been prepared by impregnating an active clay with an alcoholic or aqueous solution of a rhodium halide followed by heating to remove solvent under non-calcination conditions which does not involve heating the catalyst to a temperature above about 380° C.

In another embodiment of the invention, benzene is converted to cyclohexylbenzene with good selectivity over a rhodium trichloride-active clay catalyst which has been prepared by impregnation of an active clay with an ethanolic solution of rhodium trichloride followed by heating to remove ethanol solvent and dry the catalyst under conditions which are not conducive to calcination of the catalyst. The catalyst is preferably used in tablet form although the impregnated powder is suitable. As is demonstrated by the specific working examples herein, benzene is converted to cyclohexylbenzene with good selectivity over the inventive catalyst composite.

The feedstocks which are suitable for use in the present invention are aromatic compounds, i.e., monocyclic aromatic hydrocarbons and alkyl-substituted monocyclic aromatic hydrocarbons. Some specific examples of these are benzene, toluene, the xylene, and the like, and mixtures thereof.

The aromatic conversion according to the invention can be carried out in the presence of the above-described catalysts at temperatures as low as 100° C. and under hydrogen pressures as low as 100 p.s.i.g. The reaction temperature can be as high as 250° C., but it is preferred that no higher than 175° C. be employed. Hydrogen pressures not exceeding 1,000 p.s.i.g. are also preferred although hydrogen pressures up to about 2,000 p.s.i.g. can be used. Space velocity defined as volume of the liquid feed per volume of catalyst per hour (LHSV) should be at least 0.5 and not over about 20. However, it is preferable that the LHSV be at least 2 and not above about 15.

The present process is effected in the presence of a clay-supported rhodium catalyst. The rhodium is applied to the active clay support material preferably as an alcoholic or aqueous solution of a rhodium halide salt, preferably rhodium trichloride.

The catalyst preparation involves no calcination but simply involves the impregnation of the active clay such as Filtrol Grade 71 powder with a solution containing rhodium such as an ethanol or water solution of rhodium trichloride. The solvent is removed at reduced pressure on a rotary evaporator and the residual impregnated powder is used as the catalyst. The Filtrol can be used in the powder form or as tablets. Tablets can be prepared and impregnated with rhodium or the powder can be impregnated and then converted to tablets. In the preparation of tablets it is advantageous to incorporate about three weight percent graphite as a processing aid. It is desirable that the tablets have a crushing strength of 5–10 pounds. Filtrol tablets, for example, can be readily treated with rhodium by applying an ethanolic solution of rhodium trichloride as an atomized spray.

Following impregnation of the active clay with the solution of rhodium halide salt, the solvent can be removed in vacuo at ambient temperatures, say, about 25° C. The impregnated clay can be further dried by heating at temperatures in the range 110–120° C., although temperatures up to about 380° C. can be used. The heating is continued for a period of time and under conditions sufficient to remove substantially all of the solvent but insufficient to calcine the catalyst composition.

As indicated above, the support material for the catalyst of the invention is an activated clay. Good results are obtained when a support characterized by montmorillonite structure is impregnated with an alcoholic or aqueous solution of a rhodium halide followed by heating to remove the solvent. A typical analysis of dry Filtrol Grade 71 clay powder suitable for employment in the practice of the present invention is as follows: 71.2% $SiO_2$, 16.5% $Al_2O_3$, 3.6% $Fe_2O_3$, 3.2% MgO, 2.6% CaO, 1.3% $SO_3$, 1.0% ($K_2O+Na_2O$), and 0.6% $TiO_2$ (analysis on a volatile free basis).

Suitable clays are available commercially as, for example, Filtrol Grade 71, Filtrol Grade 62, Filtrol Grade 49, and the like (sold by Filtrol Corporation, Vernon, California). Filtrol Grade 49 and Filtrol Grade 62 clays have the following analysis: 74.0% $SiO_2$, 17.5% $Al_2O_3$, 4.5% MgO, and 1.4% $Fe_2O_3$. Samples of Filtrol Grade 49 and Filtrol Grade 62 were analyzed by the supplier after heating the Filtrol samples at 1700° F. In this heat treatment Filtrols 49 and 62 lost, respectively, 17% and 5% volatiles.

The rhodium halide-active clay catalyst of the invention generally contains from about 0.001 weight percent to about 10 weight percent rhodium, preferably 0.05 weight percent to 2 weight percent rhodium.

The present invention is advantageously practiced under substantially anhydrous conditions and can be carried out in a batchwise, semi-continuous or continuous operation. However, continuous operation is more suitable for commercial utilization. In a continuous process, the aromatic hydrocarbon-hydrogen feed can be passed over the fixed bed catalyst in an upflow or downflow manner.

The reaction can be conducted in the presence of or in the substantial absence of added reaction solvents or diluents. In the modification wherein added solvent is employed, the solvents which are liquid at reaction temperature and pressure and are inert to the catalyst, reactants and reaction products are suitably employed. Preferred solvents to be utilized in this modification are saturated hydrocarbons of from 6–16 carbon atoms, e.g., acyclic alkanes such as hexane, decane, octane, dodecane, and hexadecane, as well as cycloalkanes such as cyclohexane, cyclooctane, cyclododecane, and decahydronaphthalene.

In summary, the preferred embodiment of the present invention comprises contacting benzene, preferably containing little if any sulfur, at a temperature of 110 to 175° C., at a LHSV of 2 to 15, and under a hydrogen pressure of 200 to 1,000 p.s.i.g. with a catalyst comprising rhodium trichloride on an active clay support which catalyst has been prepared by impregnating with an ethanolic solution of the rhodium trichloride followed by heating to remove solvent (ethanol) under non-calcination conditions at a temperature below about 380° C., but sufficient to volatilize and remove the ethanol from the impregnated catalyst. Cyclohexylbenzene is recovered from the reaction mixture.

The operability of the present invention is shown by the following working examples. It is to be noted that Example I (Runs 1 and 2) are continuous runs whereas Example II is a batch run.

EXAMPLE I (A) Catalyst Preparation

A sample (100 g.) of Filtrol Grade 71 powder was treated with a solution of 2.5 g. rhodium trichloride in 100 ml. ethanol. The ethanol was removed under reduced pressure on a rotary evaporator and the residual powder was dried overnight at 110° C. Approximately three weight percent graphite was added as a processing aid and the impregnated powder was converted to tablets for use as a catalyst in the runs described in the present example.

(B) Cyclohexylbenzene Run 1

A charge of 29 ml. (21.0 g.) of the above catalyst (1% Rh) was placed in a one-half inch I.D. upflow tube reactor bedded with 45 ml. of 3 mm. glass beads and the catalyst was covered with 8 ml. of 4 mm. glass beads. The system was pressure checked, heated to 125° C., and pressured to 500 p.s.i.g. $H_2$. During a reaction period of approximately eight hours, benzene was pumped in at an average rate of about 68 ml./hour. The reactor effluent was collected in a receiver which was changed at approximately one-hour intervals, and the composition of each sample was determined by GLC analysis. The GLC analyses of samples taken during the last five hours of the run were averaged and the results showed 17% conversion based on benzene with a selectivity of 41% to cyclohexane and 49% to cyclohexylbenzene.

(C) Cyclohexylbenzene Run 2

This run was carried out in the same manner as run 1 over the same catalyst but benzene was pumped in at a rate of 120 ml./hour. The GLC analyses of samples taken during the last 4⅔ hours of the eight-hour run were averaged and the results showed 15% conversion based on benzene with a selectivity of 34% to cyclohexane and 56% to cyclohexylbenzene. Table I is given below to summarize the results of runs 1 and 2 described in Example I.

TABLE I

Cyclohexylbenzene from benzene/$H_2$ over 1% Rh/Filtrol-71 tablets

| Run no. | LHSV | $C_6H_{12}$ | $C_6H_6$ | Unknown | MeCpBz[a] | CyBz[a] | Heavies |
|---|---|---|---|---|---|---|---|
| 1 | 2 | 7.5 | 81.7 | 0.2 | 0.2 | 9.0 | 1.5 |
| 2 | 4 | 4.9 | 85.7 | 0.1 | 0.3 | 8.0 | 0.8[b] |

[a] MeCpBz and CyBz represent, respectively, methylcyclopentylbenzene and cyclohexylbenzene.
[b] Heavies were estimated by determining the residue remaining after distillation and normalization of the GLC data.

EXAMPLE II

A powdered two weight percent rhodium/Filtrol Grade 71 catalyst was prepared by combining 30 g. Filtrol Grade 71 powder with a solution of 1.5 g. rhodium trichloride (40.5% Rh) in 100 ml. absolute ethanol, and the black powder was dried for 16 hours at 110° C. A 10.0 g. sample of the catalyst was charged to a 300 ml. autoclave which was flushed with nitrogen, pressure checked and charged with 150 ml. of benzene. The autoclave was pressured to 500 p.s.i.g. with hydrogen and the system was maintained at approximately 175° C. during a reaction period of about 6½ hours. The results of this run are shown in Table II. Hydrogen pressure varied over the range of 125 to 625 p.s.i.g. during the reaction period.

TABLE II

Cyclohexylbenzene process over 2% Rhodium/Filtrol Grade 71 Powder

| Sample No. | Time on stream (min.) | Products, weight percent [1] | | | | |
|---|---|---|---|---|---|---|
| | | $C_6H_{12}$ | $C_6H_6$ | Unknown | MeCpBz[a] | CyBz[a] |
| 1 | 62 | 11.2 | 86.6 | Trace | 0.1 | 2.2 |
| 2 | 80 | 18.3 | 74.2 | 0.2 | 0.2 | 7.3 |
| 3 | 95 | 20.9 | 69.5 | 0.2 | 0.3 | 9.2 |
| 4 | 122 | 27.4 | 58.4 | 0.3 | 0.4 | 13.4 |
| 5 | 165 | 39.7 | 41.3 | 0.7 | 0.4 | 17.8 |
| 6 | 225 | 54.6 | 22.8 | 1.7 | 0.4 | 20.4 |
| 7 | 300 | 74.4 | 4.6 | 5.2 | 0.1 | 15.7 |
| 8 | 325 | 79.6 | Trace | 17.2 | Trace | 3.2 |

[1] No attempt was made to determine heavies.

NOTE.—See footnote (a) bottom of Table I.

Attention is called to the fact that the heavies produced in the present inventive cyclohexylbenzene process can be equilibrated with benzene in the presence of a Lewis acid such as aluminum chloride to increase the yield of the desired cyclohexylbenzene. The major by-product components (75 weight percent of the heavies) produced in the inventive process are polycycloalkylaromatics such as dicyclohexylbenzenes and tricyclohexylbenzenes. As is well known in the art, the transalkylation of polycycloalkylaromatics with aromatics can be effected in the presence of acid catalysts such as aluminum chloride, ferric chloride, zinc chloride, boron trifluoride, stannic chloride, polyphosphoric acid, hydrogen fluoride, antimony pentafluoride, and the like. Alternatively, heterogeneous catalysts such as active clays, zeolites, supported phosphoric acid, fluorided alumina, and the like can also be used.

We claim:

1. A process for producing cycloalkylaromatics and alkyl-substituted cycloalkylaromatics which comprises contacting a monocyclic aromatic hydrocarbon or alkyl-substituted monocyclic aromatic hydrocarbon with hydrogen in the presence of a rhodium-promoted active clay catalyst comprising from about 0.001 to about 10 weight percent rhodium under reaction conditions of temperature which produce cycloalkylaromatics.

2. A process according to claim 1 wherein benzene is converted to cyclohexylbenzene by contacting benzene and hydrogen with a rhodium trichloride-promoted active clay catalyst under liquid phase conditions.

3. A process according to claim 1 wherein said contacting is effected at a temperature of from about 100° C. to about 250° C. and at a hydrogen pressure of from about 100 p.s.i.g. to about 2,000 p.s.i.g., and further wherein the amount of rhodium present in said catalyst is in the range of 0.001 to 10 weight percent.

4. A process according to claim 1 wherein said contacting is effected with a rhodium trichloride-promoted active clay catalyst at reaction conditions of about 110° C. to about 175° C. and hydrogen pressures in the range of about 200 to about 1,000 p.s.i.g.

5. A process according to claim 1 wherein benzene is converted to cyclohexylbenzene by contacting with a rhodium trichloride-promoted Filtrol Grade 71 active clay catalyst at a temperature in the range of about 110° to about 175° C. and liquid phase conditions.

References Cited

UNITED STATES PATENTS

| 2,952,716 | 9/1960 | Haensel | 260—683.65 |
| 3,153,678 | 10/1964 | Logemann | 260—667 |
| 3,274,276 | 9/1966 | Louvar | 260—671 R |
| 3,317,611 | 5/1967 | Louvar et al. | 260—668 F |
| 3,347,945 | 10/1967 | Slaugh | 260—668 F |
| 3,349,139 | 10/1967 | Jaffe | 260—667 |
| 3,349,140 | 10/1967 | Weitkamp | 260—667 |
| 3,391,206 | 7/1968 | Hartog | 260—667 |
| 3,412,165 | 11/1968 | Slaugh et al. | 260—668 R |
| 3,760,017 | 9/1973 | Arkell et al. | 260—668 R |
| 3,760,018 | 9/1973 | Suggitt et al. | 260—668 R |
| 3,760,019 | 9/1973 | Crone et al. | 260—668 R |

CURTIS R. DAVIS, Primary Examiner

U.S. Cl. X.R.

260—667